United States Patent [19]
Neff

[11] Patent Number: 5,336,279
[45] Date of Patent: Aug. 9, 1994

[54] ARTICLE AND A METHOD FOR PRODUCING AN ARTICLE HAVING A HIGH FRICTION SURFACE

[76] Inventor: Charles Neff, 384 McKinley, Grosse Pointe, Mich. 48236

[21] Appl. No.: 22,988

[22] Filed: Feb. 26, 1993

Related U.S. Application Data

[62] Division of Ser. No. 952,682, Sep. 24, 1992, which is a division of Ser. No. 453,684, Dec. 20, 1989, Pat. No. 5,181,939.

[51] Int. Cl.$^5$ .............................................. B24D 3/00
[52] U.S. Cl. ........................................ 51/293; 51/295; 51/298; 51/308
[58] Field of Search .................. 51/293, 295, 298, 308

[56] References Cited

U.S. PATENT DOCUMENTS

| | | | |
|---|---|---|---|
| 2,424,140 | 7/1947 | Beecher | 204/16 |
| 2,904,418 | 9/1959 | Fahnoe | 51/293 |
| 3,048,482 | 8/1962 | Hurst | 51/298 |
| 3,625,666 | 12/1971 | James | 51/295 |
| 4,078,906 | 3/1978 | Green | 51/295 |
| 4,643,740 | 2/1987 | Nicolson | 51/295 |
| 5,181,939 | 1/1993 | Neff | 51/298 |

*Primary Examiner*—Mark L. Bell
*Assistant Examiner*—Willie J. Thompson
*Attorney, Agent, or Firm*—Leydig, Voit & Mayer

[57] ABSTRACT

A product and a process for producing a matrix and a tool for use in abrasive or cutting applications including a base tool structure which may be armed with a plurality of triangular or conically shaped structures 24B consisting of abrasive particles 32 bonded together in a braze metal 38. The structures 24B may be prepared in a manner which provides a selectable rake angle. Rake angles including negative 46, neutral 46' and positive 46" may be produced. The process is accomplished by diffusing magnetizable abrasive particles on a release mechanism which has been placed on a reusable fixture 10 consisting of a plurality of balls 16 secured to a magnetized surface 14. The particles 32 stack to form structures 24 which are then encapsulated in a braze paste 26. The axis of the structures 24 is aligned with the applied magnetic field. The cones are symmetrical if the magnetic field emanates perpendicularly from the magnetized surface. If the orientation of the magnetic field is distorted the conical structures will realign themselves therewith. In this manner conical structures 24 may be formed which offer selectable rake angles. The matrix 22 formed by encapsulating the abrasive particles 32 may be removed from the release mechanism 18 and secured to a base structure 30. Once this assembly has been brazed, the base structure may be used as an abrading or cutting tool.

17 Claims, 3 Drawing Sheets

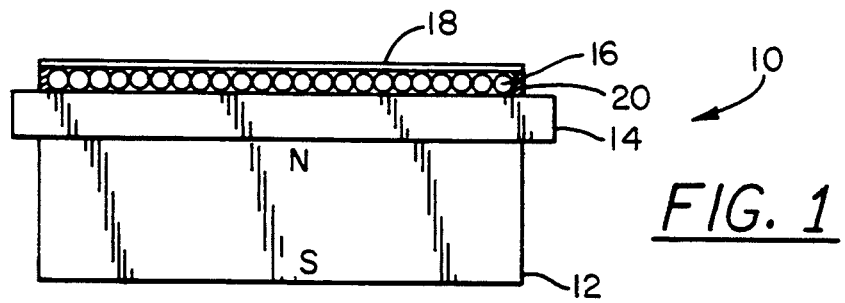
FIG. 1
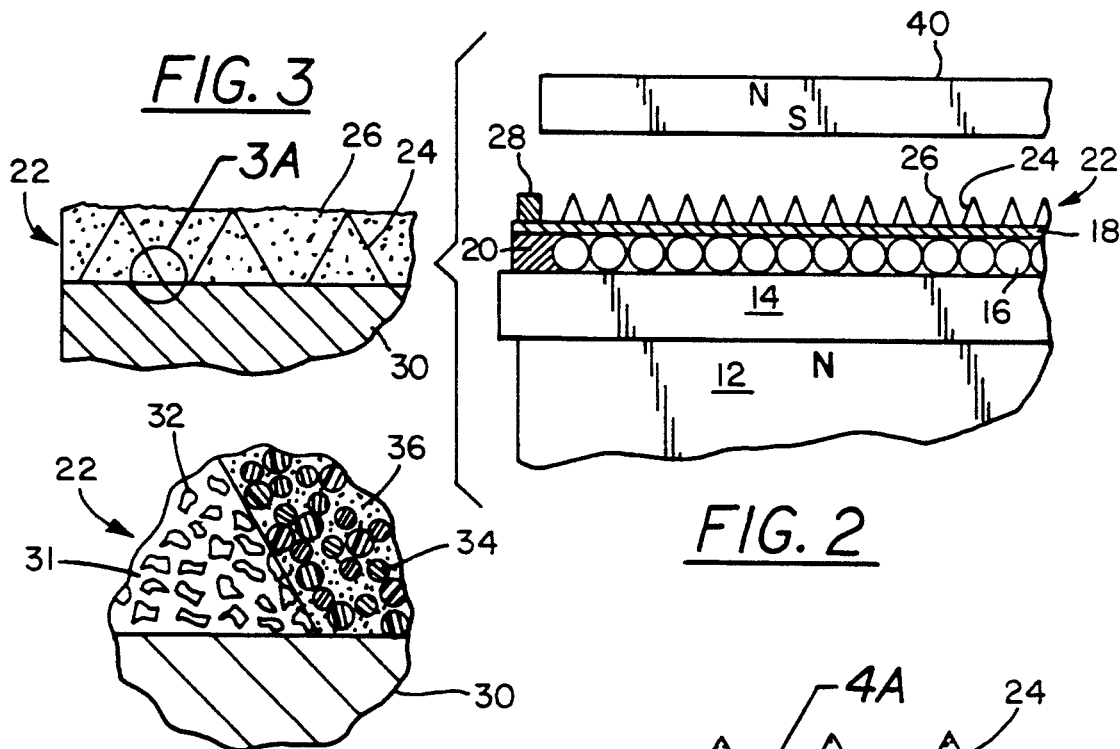
FIG. 3
FIG. 2
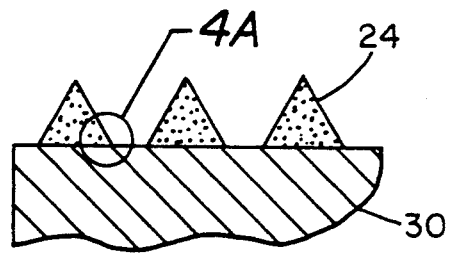
FIG. 4
FIG. 3A
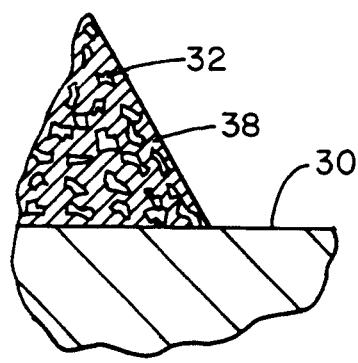
FIG. 4A

ARTICLE AND A METHOD FOR PRODUCING AN ARTICLE HAVING A HIGH FRICTION SURFACE

This is a divisional of copending application Ser. No. 07/952,682 filed Set. 24, 1992, pending which is a division of application Ser. No. 07/453,684 filed Dec. 20, 1989 U.S. Pat. No. 5,181,939.

BACKGROUND OF THE INVENTION

1. Field of the Invention

This invention relates to high friction surfaces for use in abrasive applications and the preparation of such high friction surfaces. In particular, the present invention relates to abrasive tools prepared by use of a matrix of braze paste and abrasive particles which have been oriented in a preselected pattern.

2. Description of the Prior Art

U.S. Pat. No. 3,918,217, hereinafter referred to as Oliver, discloses an abrasive tool comprising a tool blank having small steel balls secured thereto which have been armed with magnetically oriented carbide particles. The carbide particles are secured together and to the balls by braze metal. An Oliver-type tool is typically prepared, in part, by first securing a single layer of small steel balls to the surface of a tool blank. A magnet is then secured to the tool blank below the balls. Next, magnetizable carbide particles are sprinkled onto the small steel balls. The magnetic flux concentrations produced by the flux path through the small steel balls cause the carbide particles to collect on the outermost portions of the balls to form conical structures. A braze paste consisting of a binder and a braze alloy is then applied to encapsulate all of the elements of the assembly. Finally, the entire assembly is subjected to heating in a brazing furnace which bonds the braze alloy, the magnetizable particles and the balls into a unified structure. When the assembly has cooled, it may be used as an abrasive tool.

Thus, Oliver discloses a technique for preparing an abrasive tool which requires placement of protrusions on the external surface of a tool blank. These protrusions are the necessary surface for the formation of the conical structures of particles. The protrusions may take the form of small steel balls (as described) or shapes formed by machining a profile in the external surface of the tool blank. In either case, the tool blank which is the foundation of the ultimate product must be covered with protrusions. The small steel balls are expensive and require substantial labor to apply. If the protrusions are produced by machining a profile in the external surface of the tool blank, substantial skill and specialized equipment must be used.

Further, to apply carbide particles to protrusions located on a cylindrical structure, the structure must be fixtured and indexed to various rotary positions while the magnetizable carbide particles are applied. Preparing a tool in this manner is very complicated and prone to quality irregularities due to the variety of magnetic and gravitation forces which may be acting on the particles located in different rotary positions about the structure.

Further, the carbide particles form structures which align with the magnetic flux emanating from the magnetized tool blank. In the case of a cylindrical structure, the cones align with magnetic flux emanating radially (or perpendicular to a tangent drawn to the surface) from the circumferential portion of the wheel. The conical structures formed thereby will be symmetrical in all respects, and when used as a cutting tool will offer a negative rake angle to the workpiece. The Oliver technique is capable of producing only these symmetrical conical structures. If more aggressive rake angles are desired, the Oliver technique is not appropriate.

Finally, as with any cutting or abrading tool, heat produced during cutting and abrading is conducted from the point of contact between the tool and workpiece into the structure of the tool. When using an Oliver-type tool, heat passes from the conical structures through small steel balls and into the tool blank. Since these balls are brazed to the tool blank, they offer little more than point contact and consequently present a substantial impediment to the flow of heat.

OBJECTS OF THIS INVENTION

Accordingly, it is an object of this invention to provide an abrasive tool which reduces the time of preparation and labor and material cost associated with placement of protrusions on a base tool structure.

It is a specific object of this invention to provide an abrasive tool with abrasive particle structures directly secured to the base tool structure to improve the heat conduction away from the abrasive particle structures.

It is another object of this invention to provide an abrasive tool with abrasive particle structures selectively offering negative, neutral or positive rake angle cutting points to the workpiece.

It is another object of this invention to provide a matrix which may be incorporated in a process for manufacturing an abrasive tool which meets the aforestated objects and which minimizes the expense of manufacture.

Other objects, advantages and features of the present invention will become apparent upon reading the following detailed description and appended claims and upon reference to the accompanying drawings.

SUMMARY OF THE INVENTION

In accordance with one embodiment of this invention which achieves the foregoing objects, a fixture includes a generally planar magnetized base surface with protrusions formed thereon to form a dotted or patchwork or mosaic surface. The protrusions may be machined into the surface or applied to the surface in the form of small steel balls. A release mechanism or covering layer is then placed over the surface of the protrusions. The release mechanism may take the form of, for example, a thin coating of silicone or a thin sheet of polymeric material (such as Teflon). Next, magnetizable abrasive particles are diffused or sprinkled onto the surface of the release mechanism. The particles collect or orient themselves along the lines of magnetic flux to form stacks having generally triangular cross sections. The stacks have an element axis and a distal portion or working portion. The stacks define a working surface for a tool. If small steel balls are used, conical structures or cones will form at the locations of magnetic flux concentration through the balls. A coat of acrylic paint is then applied to the cones. The paint provides structural integrity to the cones. Prior to solidification of the paint, the cones may be shaped by passing a magnet near them. A magnet of opposite pole from the polarity of the base surface magnet will cause the cones to grow in height; whereas, an identically poled magnet will cause the cones to flatten. This magnet may also be used to selectively orient the base surface magnetic field which emanates from the protrusions to cause a realignment of the cones. This technique is used to produce asymmetrical cones which offer neutral or positive rake angle cutting points on the working surface of the tool.

After the cones have been shaped and the paint has dried or solidified, a braze paste or fixing means consisting of a binder mixed with a braze alloy is applied to encapsulate the cones and form a structural interconnection or nonmagnetic flexible support web or matrix between the cones. The braze paste provides a support web which maintains the cones in preselected positions before brazing and the braze alloy joins the cones in a solid structure or pattern after brazing.

After the braze paste has dried or solidified, the entire matrix may be removed from the base fixture leaving the balls or other projections behind. This matrix may then be cut to any desired shape. The release mechanism may then be removed and the matrix may be secured to another base structure having a smooth surface by application of an acrylic adhesive. The acrylic adhesive may be brushed on the matrix or the base structure or in the alternative may be preinstalled and protected by a release liner. At this point, the assembly of matrix and base structure may be placed in a braze furnace and heated at the necessary brazing temperature. After the brazing process has been completed, the assembly will feature a high friction surface which may be used as an abrasive tool.

The advantages of the present invention are numerous. For one, the protrusions are secured to a reusable fixture. Consequently, it is not necessary to apply protrusions to the external surface of each tool. Therefore, resources may be applied to create an optimum mosaic or pattern of protrusions (verses the random pattern used in the Oliver technique) which will then create respectively positioned magnetic fields. A mosaic may be selected to address performance parameters ranging from material removal effectiveness to surface finish quality. In addition, a substantial manufacturing cost advantage may be realized by eliminating the material cost of the balls as well as the labor associated with installing the balls on each tool.

Second, since the matrix is prepared on the generally planar surface of the fixture, which may be oriented in a horizontal plane, the carbide particles are influenced by magnetic flux acting along a flux axis generally transverse to the mosaic surface, which is aligned with gravitational forces. Consequently, the complications and irregularities that are encountered when applying the particles directly to irregularly shaped tools is eliminated.

In addition, the structure of the stacks of the present invention may be altered to produce a selectable rake angle (i.e., negative, neutral or positive). That is, the present invention is suitable for preparation of symmetrical stacks. These stacks are prepared by using magnetic flux having a flux axis which is generally perpendicular or normal to the mosaic surface. If a neutral or positive rake angle is desired, stacks may be prepared by using a magnetic flux axis which is adjustable and determinable relative to the mosaic surface whereby the stack axis will have a predetermined rake angle relative to the surface. For example, a neutral rake angle cone will be formed if the magnetic field is oriented such that the apex of the cone is located over a perpendicular drawn to the base circle of the cone. A positive rake angle cone will be formed if the magnetic field is oriented so that the apex of the cone is located outside of a perpendicular drawn to the base circle of the cone. In practice, the magnetic field may be selectively oriented by creating a distortion above the surface of the fixture by use of a selectively positioned magnet.

The flexibility to produce cones having a selectable rake angle constitutes a substantial performance advantage in that tools may be prepared to suit specific performance applications. That is, cones having a positive rake angle may be applied to tools used in applications requiring aggressive material removal; whereas, cones having a neutral rake angle may be used for abrasive applications requiring less material removal. Additionally, combinations of cone types may be applied to the surface of a tool so that portions of the tool may be used for aggressive material removal and other portions may be used for producing a desired surface finish. For example, the end or face portions of a cylindrically shaped wheel may be covered with cones having a positive rake angle to aggressively remove material; whereas, the circumferential surface portions may be covered with cones having a negative rake angle to achieve a desired surface finish.

BRIEF DESCRIPTION OF THE DRAWINGS

Further features and advantages of the present invention will be apparent to those skilled in the art to which the invention relates from the following detailed description of the invention made with reference to the accompanying drawings in which:

FIG. 1 is a side view of the fixture used for preparing the present invention;

FIG. 2 is a cross sectional view of a portion of the fixture shown in FIG. 1 including a section of the matrix prepared according to the present invention;

FIG. 3 is a cross sectional view of a portion of a base structure having a matrix applied thereto;

FIG. 3A is an enlarged section of FIG. 3;

FIG. 4 is a cross sectional view of a portion of an abrading tool prepared according to the present invention;

FIG. 4A is an enlarged section of FIG. 4;

DETAILED DESCRIPTION OF THE DRAWINGS

Figure 5:
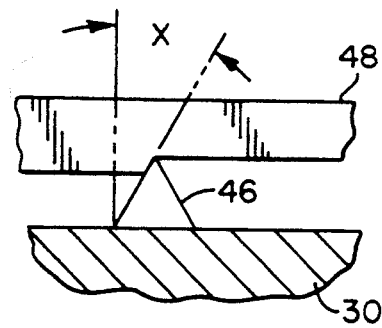
FIG. 5 is a cross sectional view of an abrading tool offering a negative rake angle to a workpiece.

The preferred embodiment of the present invention, as shown in FIG. 1, includes a fixture 10 comprising a permanent magnet 12 which is affixed to a first base structure or steel plate 14. Plate 14 provides a magnetic gap between the magnet 12 and protrusions 16. Consequently, the thickness of plate 14 is a parameter which may be adjusted until the ideal magnetic field strength is achieved. Maximum magnetic field strength is achieved if plate 14 is completely eliminated. Alternatively, the plate 14 may be non-magnetic which forms an air gap or non-magnetic gap between the magnet 12 and protrusions 16. Magnet 12 is not necessarily fixed to plate 14 and may be in the form of an electromagnet, or the like.

A single layer of protrusions in the form of steel balls 16 are affixed by adhesive 20 to plate 14. Any ferrous or retro-magnetic structure may be used in lieu of balls; for example, cylindrical steel rods may be used. A release mechanism 18 is shown as a thin layer of nonferrous material such as a sheet or film of plastic, preferably Teflon. The release mechanism is placed over the upper surface of the balls 16. A source of vacuum may be introduced to the region between the protrusions and the release mechanism 18 by providing suitable passageways (not shown). The vacuum will draw the release mechanism 18 into firm contact with the protrusions 16. This completes the fixture upon which a matrix of braze paste and magnetically oriented abrasive particles may be prepared.

The matrix 22, as shown in FIG. 2 is prepared by sprinkling or diffusing −200/+325 mesh tungsten carbide cobalt particles (not shown individually in this Figure) onto the release mechanism 18. The particles are attracted to balls 16 by the magnetic flux from magnet 12. These particles will collect on the release mechanism 18 at the locations of magnetic field concentration formed by the individual steel balls 16.

Therefore, the size, shape, location and arrangement of the balls 16 determines the pattern generated by the carbide particle collections. Larger diameter balls will provide magnetic field concentrations which are spaced farther apart. Thus, larger diameter balls may be used to produce a coarse textured surface. Specific sizes, shapes and arrangements of balls may be used to generate any desired pattern. For example, the balls may be oriented in a herringbone pattern to enhance chip elimination from the area of the tool/workpiece interface. In fact, channels may be created to provide well defined chip passageways by eliminating a respective line of balls. Alternatively, non-ferrous balls can be interspersed with steel balls 16 to alter the formation.

As the carbide particles are diffused onto the release mechanism 18, they will form collections of triangular cross sectioned structures 24. In the preferred embodiment of the present invention, the structures 24 will be conically shaped, hereinafter referred to as cones. When the cones have reached a desired height by addition of particles, they are sprayed with an acrylic paint. While the paint is still wet, the cones 24 may be shaped by passing a second magnet over the upper surface of the fixture. A second magnet 40 oriented to expose a pole opposite to that of the fixture magnet 12 is shown in FIG. 2. An oppositely poled magnet will cause the cones to grow in height; whereas, a matching poled magnet will cause the cones to flatten.

After the paint has dried or solidified, the cones are coated with a water based braze cement (not shown) which provides a protective layer isolating the acrylic paint which maintains the structural integrity of the cones from the solvent contained in the coating of braze paste 26 which is added after the braze cement. A water based cement consisting of one part Nicrobraze Cement Type S, a trademark of Wall Colmonoy Corporation, and two parts water is preferred.

Braze paste 26 is then added to encapsulate the cones. A braze paste consisting of a binder or cement, preferably 40 percent Nicrobraz Cement Grade Number 1000, a trademark of Wall Colmonoy Corporation, and a braze alloy, preferably 60 percent −325 mesh low melting point brazing filler metal. Any braze cement which dries or cures to a flexible structure will be satisfactory. Form 28 placed on the release mechanism 18 serves as the outer boundary to which the braze paste 26 will flow. The height of form 28 will define the thickness of the matrix.

The braze paste 26 cures or dries to provide a flexible matrix 22. This matrix 22 and release mechanism 18 may then be removed from the fixture 10 as a viable structural entity. The matrix may be cut to any desired pattern. The release means 18 may then be removed from the matrix 22 by pealing it away. After the release mechanism 18 has been removed, the matrix 22 may be secured to a second base structure 30, as shown in FIG. 3, by use of an acrylic based adhesive such as 3M Corporation 2 mil. High Tack Adhesive transfer tape. Any suitable adhesive or binder may be utilized. The transfer tape has a release liner which protects the adhesive until the matrix is applied to a base structure. The second base structure 30 is not necessarily steel or ferrous.

FIG. 3A is an enlarged section of FIG. 3 illustrating the matrix 22 consisting of tungsten carbide cobalt particles 32, acrylic paint 31 and the braze paste 26, which itself consists of braze metal 34 and cement 36. After the matrix has been secured to the surface of the base structure 30, the entire assembly may be placed in a braze furnace and heated to brazing conditions, that is, the necessary brazing temperature for the necessary time period. Any temperature between 1850° F. and 2150° F. for a time period of approximately 15 minutes is appropriate for a low melting point brazing filler metal. An atmosphere of pure dry hydrogen or a vacuum is recommended. A hold cycle of 30 minutes is recommended at 800° F. before elevating to braze temperature. The braze metal 34 will become molten and flow to form a mortar-like bond of metal 38 (as shown in FIG. 4A) which secures or joins the tungsten carbide cobalt particles 32 together individually and to the base structure 30. Thus, after brazing, only the braze alloy remains as the binder has vaporized.

The final product, as shown in FIG. 4, is a base structure 30 which is armed with cones 24B which provide the abrading tool cutting points. The base structure may be a cylindrical shape (such as a grinding wheel or an end mill), a flat rectangular shape (such as a hand file), or a long thin shape (such as a saw blade).

Figure 6:
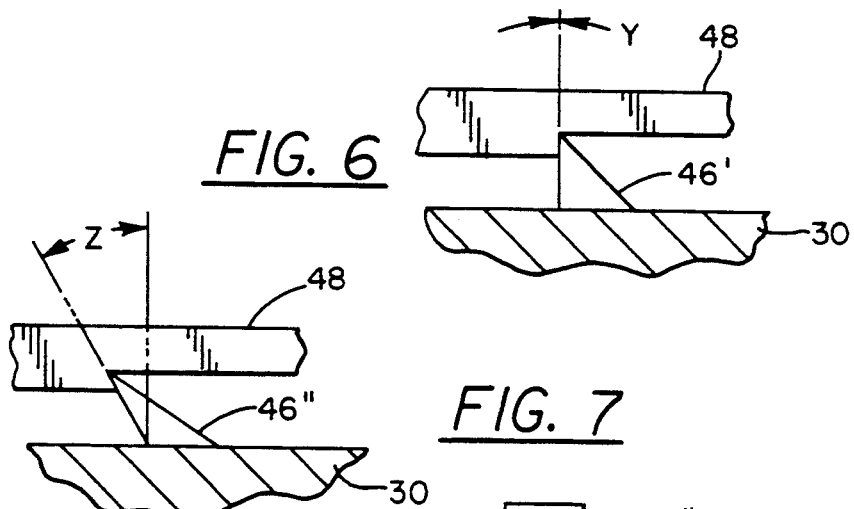
FIG. 6 is a cross sectional view of an abrading tool offering a neutral rake angle to a workpiece.
Figure 7:
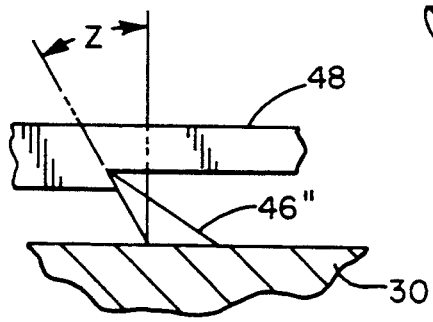
FIG. 7 is a cross sectional view of an abrading tool offering a positive rake angle to a workpiece.

A symmetrical cone 46 as shown in FIG. 5 will present a negative rake angle X with respect to the workpiece 48 and the base structure 30. A negative rake angle is preferred in abrasive applications with low-rate material removal. A symmetrical cone 46 may be produced by the fixture described herein. FIG. 6 illustrates an asymmetric cone 46' having a neutral rake angle Y. A neutral rake angle is preferred in moderate-rate material removal applications. FIG. 7 illustrates another asymmetric cone 46" having a positive rake angle Z. A positive rake angle Z is preferred in aggressive-rate material removal applications.

Figure 8:
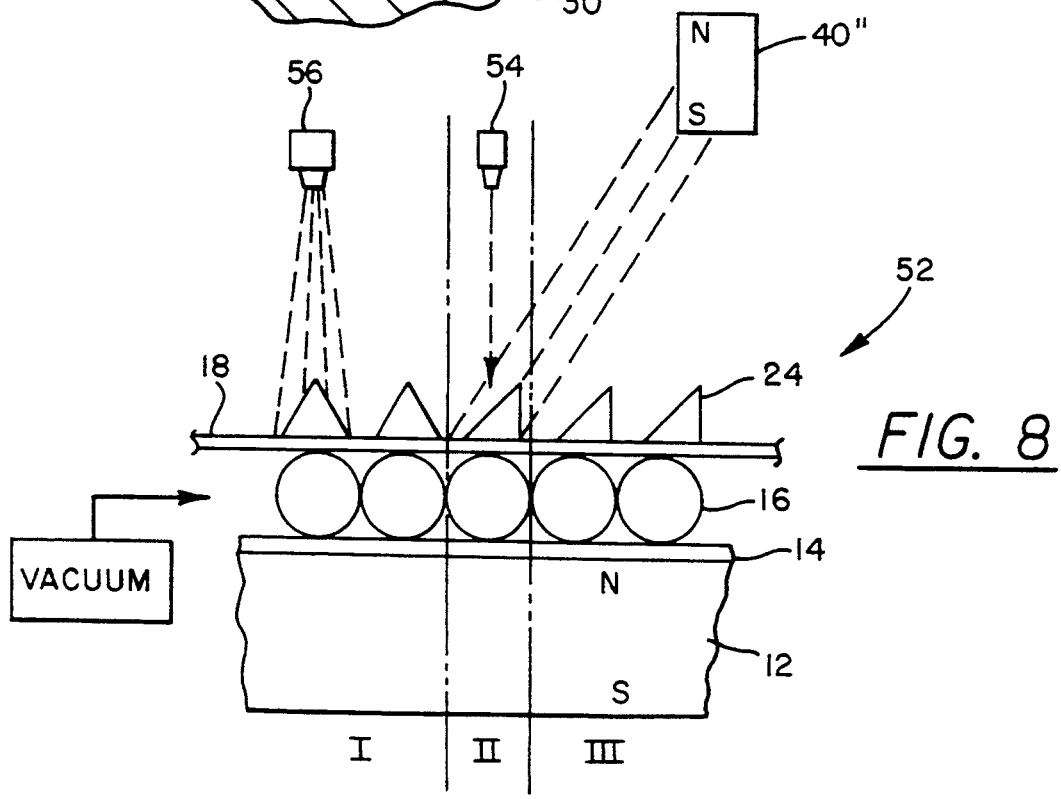
FIG. 8 is a side view with portions shown in cross section of a fixture used to prepare a matrix having structures featuring neutral rake angles.

These asymmetrical cones may be generated by using the fixture shown in FIG. 8. The fixture 52 comprises a permanent magnet 12, secured to a steel plate 14, having steel balls 16 secured thereto. The release mechanism 18 is then placed over the balls 16. Carbide particles (not shown individually in this Figure) are then sprinkled through diffuser 56 onto the release mechanism 18 to form cones 24 having generally symmetrical shapes. (See portion I). The magnetic flux emanating from the steel balls located in portion II is distorted by the presence of second magnet 40" such that the lines of flux in portion II are no longer emanating perpendicular to the surface. Consequently, the cones located in portion II will align themselves with the distorted lines of flux. The individual cone shown located in portion II has a neutral rake angle. A positive rake angle is formed by locating magnet 40" farther to the right (in relation to this Figure) from portion II. Acrylic paint is applied to the cones 24 located in portion II by applicator 54. Once the paint has dried or solidified, the cones will maintain the orientation produced by the distorted lines of flux.

The cones located in portion III are ready to be encapsulated with braze paste (not shown) as described previously. In actual operation, the magnet 40", paint application mechanism 54 and diffuser 56 will move with respect to the fixture 52 and thus prepare a continuous matrix of magnetically oriented carbide particles and braze paste.

Figure 9:
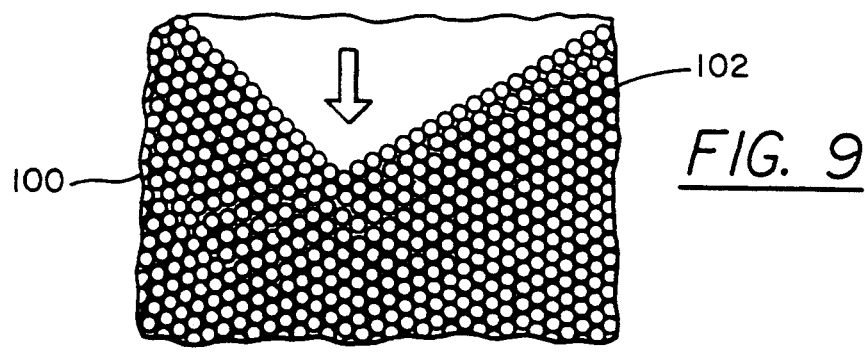
FIG. 9 is an enlarged plan view of a high friction surface having a fine textured pattern on a first portion and a coarse textured pattern on a second which in combination produce a herringbone pattern.

FIG. 9 shows an abrasive surface prepared with a fine textured matrix of structures on a first half portion 100 and a coarse textured matrix on the second half portion 102. In addition, the individual matrices provide a herringbone pattern which facilitates conveyance of chips to each side as the abrasive surface is advanced relative to a workpiece in the direction of the arrow shown. The coarse and fine textured matrices are produced by selecting ball sizes which will produce the desired spacing between the individual carbide structures. The herringbone pattern is produced by a specific arrangement of balls on the fixture previously described and shown in FIG. 1.

Figure 10:
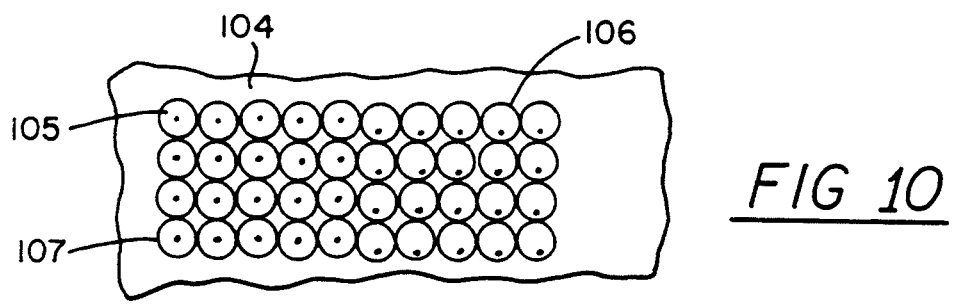
FIG. 10 is an enlarged plan view of a high friction surface having carbide structures with neutral rake angles on a first portion and a second portion covered with carbide structures having a negative rake angle.

FIG. 10 shows an abrasive surface prepared with a negative rake angle matrix placed on a first portion 104 and a neutral rake angle matrix placed on a second portion 106. The apex 105 of the conical structures is illustrated as a dot and the respective base circle 107 of the structures is shown as a circle. Such a technique may be utilized to create an abrasive wheel which may be used to cut and finish a workpiece. That is, a more aggressive rake angle cone (i.e., a cone having a neutral rake angle) may be used on the first portion advanced into the workpiece and a less aggressive rake angle cone (i.e., a cone having a negative rake angle) may be used on the second trailing portion to finish the surface of the workpiece. Thus in one advance of the abrasive wheel, two operations may be performed.

Figure 11:
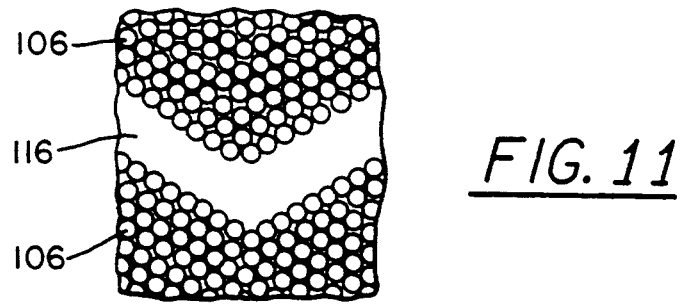
FIG. 11 is an enlarged plan view of a high friction surface prepared by placing a pattern of carbide structures on selected portions and leaving other portions void.

FIG. 11 shows an abrasive surface prepared having portions 108 thereof covered by a matrix and portions 110 left void to offer passageways facilitating the elimination of scrap from the tool/workpiece interface. An identical abrasive surface may be prepared by leaving out rows of protrusions on the fixture. That is, the matrix may be prepared as a continuous structure wherein selected rows of small steel balls 16 (as shown in FIG. 1) may be left void thereby producing passageways facilitating the elimination of scrap from the tool/workpiece interface. This eliminates the necessity to cut and patch together portions of the matrix to produce the voids.

Any combination and permutation of textures, patterns, voids, and rake angles may be embodied on any one surface to produce a tool which satisfies numerous performance criteria.

All embodiments of the present invention have been described using tungsten carbide cobalt abrasive particles as an example of a magnetizable particle. It is clearly within the scope of this invention to use any magnetizable particle. For example, diamonds coated with nickel may be used. Further, the structures formed at the points of magnetic field concentrations formed by the protrusions may consist of a plurality of particles as hereinbefore described or in the alternative may comprise one particle per point. An example of such an application would be for use in preparing mono-layered diamond tools as described in U.S. Pat. No. 3,894,673.

Figure 12:
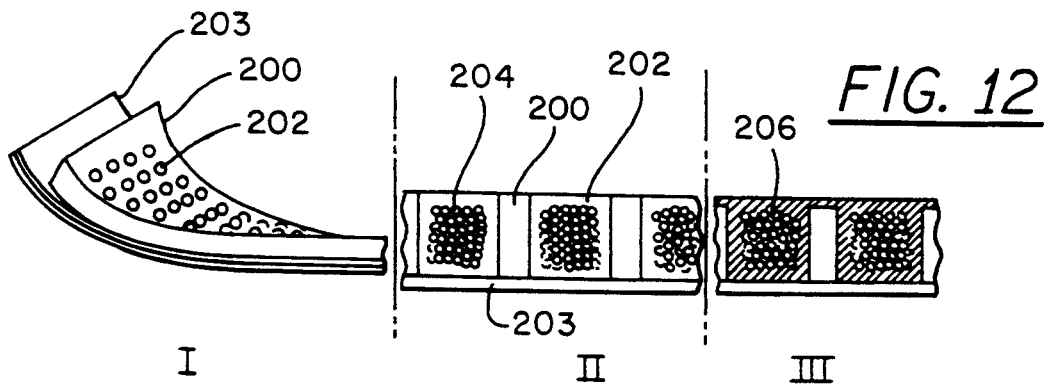
FIG. 12 is a side view with portions shown in cross section illustrating an alternative embodiment of the present invention.

In an alternative embodiment, the matrix is prepared by positioning the particles on a release mechanism using mechanical techniques and then encapsulating them in a braze paste. Several techniques may be used to position the particles including manually arranging the particles. Once the particles have been arranged, they may be encapsulated with braze paste to produce a brazable matrix. Another technique utilizes a stencil-like form having openings which provide locations for the particles. Once the particles have been placed in the openings of the form, the form can be removed leaving the particles in their respective positions to be encapsulated in braze paste. Alternatively, as shown in portion I of FIG. 12, a stencil-like form 200 constructed of a moulded braze paste having openings 202 at selected locations may be used. A release liner 203 having no openings is placed in abutting relation to form 200. In portion II of FIG. 12, individual particles 204 are shown placed in the openings 202. Additional braze paste 206 is added in portion III of FIG. 12 to encapsulate the particles and retain them in their respective openings. In this manner a braze matrix may be prepared which is suitable for use in preparing a mono-layered diamond tool.

It is further thought that the apparatus and method of the present invention and many of its intended advantages will be understood from the foregoing description and it will be apparent that various changes may be made in form, construction and arrangement of parts thereof without departing from the spirit and scope of the invention or sacrificing all of its material advantages; the form herein before described being merely a preferred or exemplary embodiment.

What is claimed is:

1. A method of preparing a structurally viable matrix to provide a pattern of abrasive elements comprising:
   covering a plurality of magnetizable protrusion means extending from a base means with a release means for releasing said matrix;
   applying magnetizable particles to said release means;
   orienting said magnetizable particles by means for generating a first magnetic flux along a flux path generally transverse to said base means; and
   applying binding means for at least partially encapsulating said magnetizable particles and forming a structural interconnection therebetween.

2. The method of claim 1 including the step of selectively orienting said first magnetic flux and aligning said magnetizable particles therewith prior to applying said binding means.

3. The method of claim 1 wherein said binding means is a mixture of braze alloy and a binder.

4. The method of claim 1 wherein said magnetizable particles are magnetizable abrasive particles.

5. The method of claim 1 wherein said magnetizable particles form structures having triangular cross sections at said preselected locations.

6. The method of claim 1 wherein said first flux generating means is positioned beneath said release means and said base means.

7. The method of claim 6 including the step of orienting said magnetizable particles by means for generating a second magnetic flux along a flux path generally transverse to said base means.

8. The method of claim 7 wherein said second flux generating means is positioned above said release means.

9. The method of claim 8 wherein said second flux generating means is oppositely poled from said first flux generating means.

10. A matrix prepared according to the method of claim 1.

11. A method of preparing an article having a high friction surface using the method of claim 1 and the additional steps comprising:
   removing said matrix from said release means;
   affixing said matrix to a base structure; and
   heating said matrix and said base structure to brazing conditions.

12. A method of preparing a structurally viable matrix on an apparatus having a release means disposed on a plurality of magnetized members oriented in a preselected pattern comprising the steps of:
   diffusing magnetizable abrasive particles on said release means;
   at lease partially encapsulating said particles in a fixing means to produce a matrix, curing said fixing means; and
   removing said matrix from said apparatus.

13. The method of claim 12 including the additional step of selectively orienting said magnetizable particles by means for generating a magnetic flux prior to encapsulating said particles.

14. A method of preparing an article having a high friction surface using the method of claim 12 and the additional steps comprising:
   removing said matrix from said release means;
   affixing said matrix to a base structure; and
   heating said matrix and said base structure to brazing conditions.

15. An article having a high friction surface produced according to the method of claim 12.

16. A method for preparing an article having a high friction surface comprising:
   applying magnetizable particles to a release means disposed on a plurality of magnetized protrusions;
   applying a fixing means capable of maintaining said particles in predetermined locations before brazing, said fixing means being capable of securing said particles to a base structure after brazing;
   releasing a matrix formed of said abrasive particles and said fixing means from said protrusions,
   affixing said matrix to a base structure; and
   heating said matrix and said base structure to brazing conditions.

17. An article prepared according to the method of claim 16.

* * * * *